(12) United States Patent
Itou et al.

(10) Patent No.: US 7,358,640 B2
(45) Date of Patent: Apr. 15, 2008

(54) AUTOMOTIVE ROTARY ELECTRIC MACHINE (75) Inventors: Yoshihito Itou, Tokyo (JP); Toshiaki Kashihara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 58 days.

(21) Appl. No.: 10/514,841

(22) PCT Filed: Oct. 7, 2002

(86) PCT No.: PCT/JP02/10416

§ 371 (c)(1),
(2), (4) Date: Nov. 18, 2004

(87) PCT Pub. No.: WO2004/032309

PCT Pub. Date: Apr. 15, 2004

(65) Prior Publication Data

US 2006/0152103 A1  Jul. 13, 2006

(51) Int. Cl.
*H01R 39/58* (2006.01)
*G08B 21/00* (2006.01)
*H02K 13/00* (2006.01)

(52) U.S. Cl. .................. 310/245; 340/648; 310/242; 310/249

(58) Field of Classification Search ............... 340/648; 310/245
See application file for complete search history.

(56) References Cited

U.S. PATENT DOCUMENTS

| 4,024,525 | A | * | 5/1977 | Baumgartner et al. ...... 340/648 |
| 4,316,186 | A | * | 2/1982 | Purdy et al. ............... 340/648 |
| 4,334,188 | A | * | 6/1982 | Dudley ..................... 324/133 |
| 4,390,870 | A | * | 6/1983 | Michael .................... 340/648 |
| 4,528,557 | A | * | 7/1985 | Braun ....................... 340/648 |
| 4,636,778 | A | * | 1/1987 | Corkran et al. ............ 340/648 |
| 5,731,650 | A | | 3/1998 | Scheucher |

FOREIGN PATENT DOCUMENTS

| DE | 4104159 | * | 8/1992 |
| JP | 55-139408 | | 3/1954 |
| JP | 49-058309 A | | 6/1974 |
| JP | 57-101549 A | | 6/1982 |
| JP | 62-155745 A | | 7/1987 |
| JP | 06-178458 A | | 6/1994 |

* cited by examiner

*Primary Examiner*—Burton Mullins
(74) *Attorney, Agent, or Firm*—Sughrue Mion, PLLC (57) ABSTRACT The present invention provides an automotive rotary electric machine enabling brush abrasion limit detection reliability to be increased and stable brush abrasion limit detection indication to be performed. The construction thereof is provided with a detecting terminal for sensing a brush abrasion limit when a brush has abraded to a predetermined length by coming into contact with a coil spring that forces the brush, and a determining circuit constructed so as to compare output from the detecting terminal and a threshold value, to enter an ON state (a brush abrasion limit detection state) once the output exceeds the threshold value, and thereafter to maintain the ON state. Thus, because the ON state of the determining circuit is maintained even if output from the detecting terminal fluctuates due to vibration, noise, etc., false detection of the brush abrasion limit resulting from the fluctuations in the output from the detecting terminal can be prevented.

3 Claims, 6 Drawing Sheets

AUTOMOTIVE ROTARY ELECTRIC MACHINE

TECHNICAL FIELD

The present invention relates to a rotary electric machine mounted to an automotive vehicle such as a passenger car, a truck, an electric train, etc., and particularly to a control apparatus for detecting an abrasion limit of a brush mounted to a rotary electric machine.

BACKGROUND ART

Figure 11:
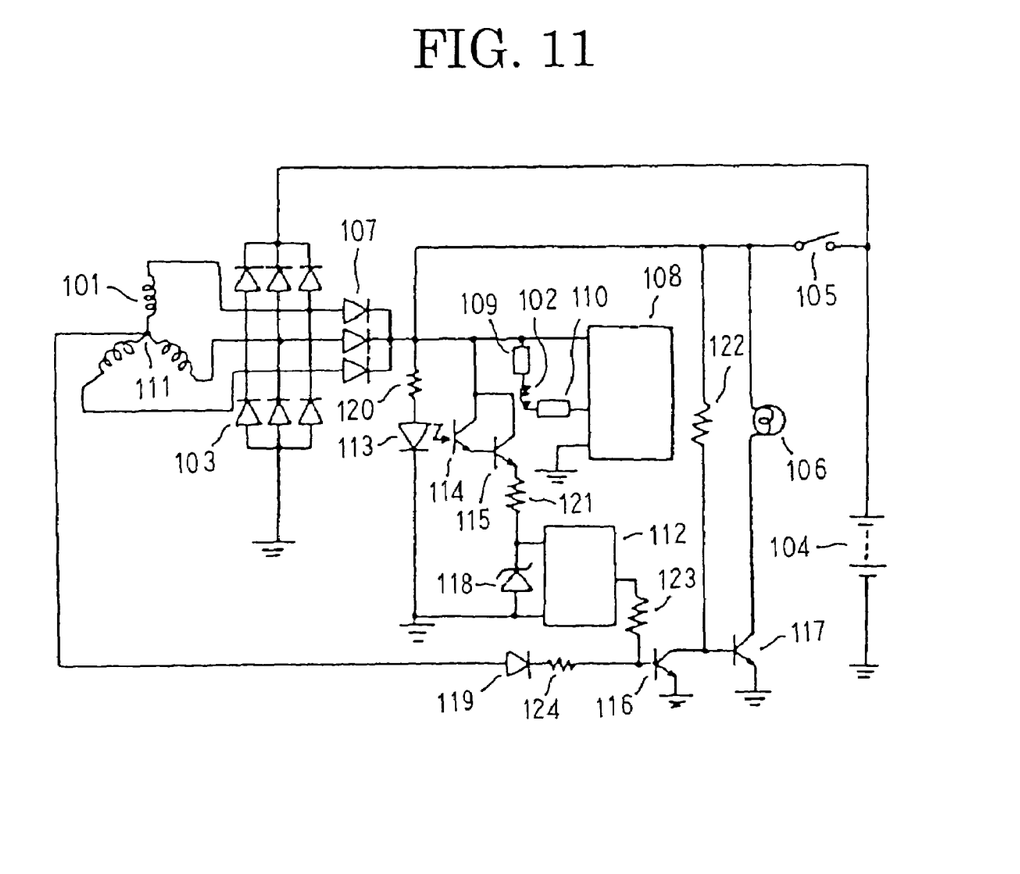
FIG. 11 is a circuit diagram explaining an electrical circuit for an automotive vehicle mounted with a conventional automotive alternator.
Figure 12:
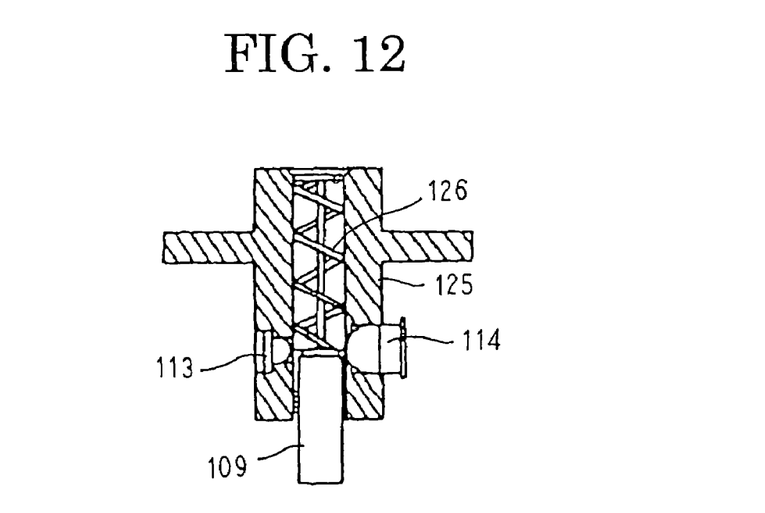
FIG. 12 is a cross section showing a construction of a power supply mechanism portion in the conventional automotive alternator.

FIG. 11 is a circuit diagram explaining an electrical circuit for an automotive vehicle mounted with a conventional automotive alternator such as that described in Japanese Patent Laid-Open No. SHO 57-101549 (Gazette), for example, and FIG. 12 is a cross section showing a construction of a power supply mechanism portion in the conventional automotive alternator.

In conventional automotive alternators, when a key switch 105 is closed, an electric current flows from a storage battery 104 through the key switch 105, a positive electrode brush 109, a field winding (a rotor winding) 102, and a negative electrode brush 110 to a power generation control apparatus 108. The field winding 102 is excited with a direct current by this electric current.

In this state, when a rotor is driven to rotate by rotation of an engine, a rotating magnetic field is applied to an armature winding (a stator winding) 101, giving rise to an electromotive force in the armature winding 101. This alternating-current electromotive force is converted into a direct current by a three-phase full-wave rectifier 103, and serves to charge the storage battery 104. This alternating-current electromotive force is also converted into a direct current by an auxiliary rectifier 107 and is supplied to the field winding 102. As the rotational speed of the rotor rises, the power generation control apparatus 108 controls the electric current flowing through the field winding 102 such that the voltage of the storage battery 104 is constant.

Now, the positive electrode brush 109, as shown in FIG. 12, is housed inside a brush holder 125 so as to be pushed outside by a force from a coil spring 126. Moreover, although not shown, the negative electrode brush 110 is also similarly housed inside the brush holder 125. Thus, the positive electrode brush 109 and the negative electrode brush 110, due to the force from the coil springs 126, slide in contact with slip rings (not shown) functioning as current receiving portions rotating together with the rotation of the rotor, tip portions thereof being gradually abraded. The electric current flows through the positive electrode brush 109, a slip ring, the field winding 102, and a slip ring to the negative electrode brush 110.

A light source 113 and a photodetector 114 are disposed on the brush holder 125 so as to face each other on mutually opposite sides of the positive electrode brush 109. The light source 113 and the photodetector 114 are constituted by a light-emitting diode and a phototransistor, for example, and are disposed facing the brush holder 125 so as to correspond to an allowable push-out limit position of the positive electrode brush 109.

Thus, in a normal state, the positive electrode brush 109 is between the light source 113 and the photodetector 114, and the photodetector 114 does not receive any light from the light source 113. Then, when the positive electrode brush 109 is abraded to the abrasion limit, the photodetector 114 receives light from the light source 113, and an electric current flows. This electric current is amplified by a transistor 115, and is converted by a Zener diode 118 so as to obtain a constant voltage. This constant voltage is applied to an astable multivibrator 112, and the astable multivibrator 112 performs low-frequency oscillation. Because an electric current from a neutral point 111 placing a transistor 116 in an ON state by means of a diode 119 and a resistor 124 flows into the astable multivibrator 112 through a resistor 123 while the output state of the astable multivibrator 112 is at a low level, the transistor 116 is placed in an ON or an OFF state depending on whether the output state of the astable multivibrator 112 is low level or high level. A transistor 117 is switched OFF when the transistor 116 is ON, and the transistor 117 is switched ON when the transistor 116 is OFF. In addition, while the transistor 117 is placed in the ON state, an indicating lamp 106 is lit.

In other words, when the positive electrode brush 109 is abraded to the abrasion limit, the astable multivibrator 112 performs low-frequency oscillation, and the indicating lamp 106 is placed in a periodic flashing state (an abrasion limit sensing indicating state). Thus, by checking for the periodic flashing of the indicating lamp 106, a vehicle occupant can recognize that the positive electrode brush 109 has abraded to the abrasion limit and can perform brush replacement. Moreover, if the light source 113 and the photodetector 114 are disposed on the brush holder 125 so as to face each other on mutually opposite sides of the negative electrode brush 110, the abrasion limit of the negative electrode brush 110 will be detected. Moreover, power generation is stopped if either the positive electrode brush 109 or the negative electrode brush 110 reaches the abrasion limit, and current supply to the field winding 102 is no longer performed.

However, in conventional automotive alternators, the slip rings rotate during vehicle operation, and the positive electrode and the negative electrode brushes 109 and 110 are constantly and continually being subjected to vibration and fluctuation. When roundness of the slip rings deteriorates, the vibration and the fluctuation of the positive electrode and the negative electrode brushes 109 and 110 increase further. There are also influences such as noise, etc., causing detection output from the photodetector 114 to fluctuate. For these reasons, one disadvantage has been that malfunctions may arise such as the abrasion limit sensing indicating state being entered before the brushes 109 and 110 reach the abrasion limit, or the abrasion limit sensing indicating state not being entered even if the brushes 109 and 110 reach the abrasion limit, etc., reducing the reliability of brush abrasion limit sensing.

Furthermore, in conventional automotive alternators, a constant voltage from a Zener diode 118 is used as an activating power source for the astable multivibrator 112. However, there are cases in which the electric current flowing through the photodetector 114 deteriorates significantly due to the effects of the vibration of the brushes, etc. In other words, the reliability of the supply of current from the photodetector 114 to the astable multivibrator 112 is low. Because the amplitude of pulse waveforms of this astable multivibrator 112 is dependent on the activating power source, if the electric current flowing through the photodetector 114 drops, the amplitude of those pulse waveforms decreases, hindering the operation of the transistors 116 and 117 and the lighting of the indicating lamp 106. Thus, another disadvantage has been that even if the brush abrasion limit is sensed normally, there may be insufficient electric power to activate the indicating lamp 106, making it difficult to confirm the periodic flashing of the indicating lamp 106.

In addition, in conventional automotive alternators, because the brush abrasion limit detection and display circuits are constructed independently from the power generation control apparatus 108, another disadvantage has been that the number of parts and costs are increased.

DISCLOSURE OF INVENTION

The present invention provides an automotive rotary electric machine eliminating malfunctions resulting from vibration and fluctuation of brushes and the influence of noise, etc., to increase the reliability of brush abrasion limit detection, and eliminating shortages of electric power for activating indicators to enable stable brush abrasion limit detection indication to be performed by constructing a determining circuit so as to monitor output from a sensing portion for sensing a brush abrasion limit, to detect the brush abrasion limit once that output exceeds a threshold value, and to hold that brush abrasion limit detection state.

The automotive rotary electric machine according to the present invention includes:
a rotor having:
a field winding for generating a magnetic flux on application of an excitation current;
a plurality of magnetic poles magnetized by the magnetic flux; and
a current receiving portion electrically connected to the field winding;
a power supply mechanism portion having:
a brush; and
a coil spring for forcing the brush so as to be placed in contact with the current receiving portion;
a brush abrasion limit sensing portion for sensing that the brush has abraded to a predetermined length; and
a brush abrasion limit detecting means constructed so as to monitor an output from the brush abrasion limit sensing portion, to enter a brush abrasion limit detection state at a point in time when the output exceeds a set value, and thereafter to maintain the brush abrasion limit detection state regardless of a magnitude relationship between the output and the set value.

BEST MODE FOR CARRYING OUT THE INVENTION

A preferred embodiment of the present invention will now be explained with reference to the drawings.

Preferred Embodiment

Figure 1:
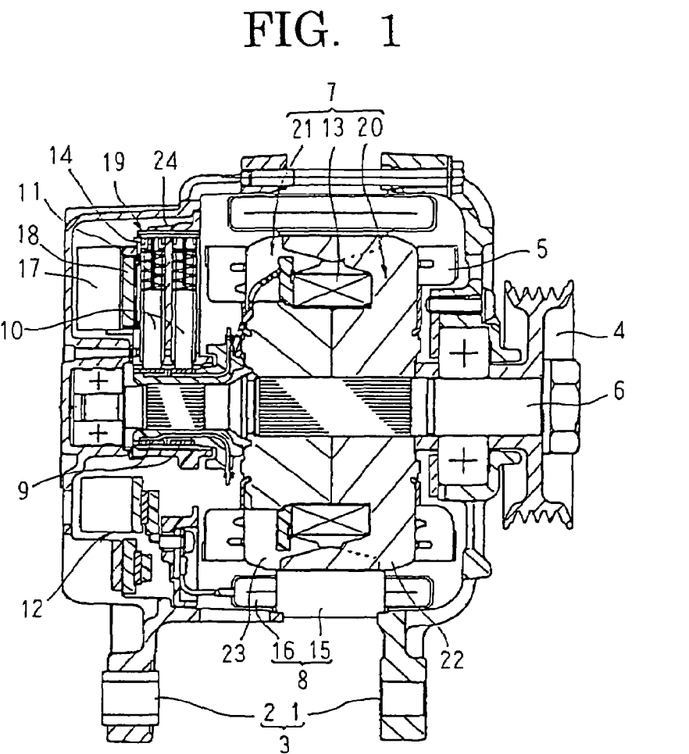
FIG. 1 is a longitudinal section showing an automotive alternator according to a preferred embodiment of the present invention.
Figure 2:
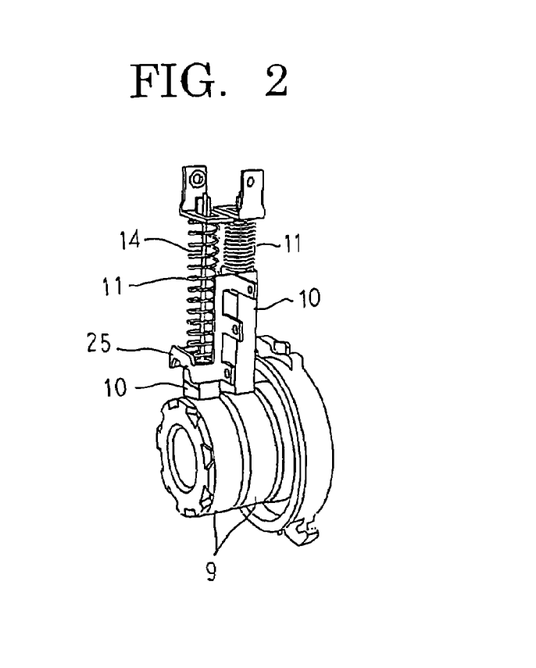
FIG. 2 is a perspective showing a vicinity of brushes in the automotive alternator according to the preferred embodiment of the present invention.
Figure 3:
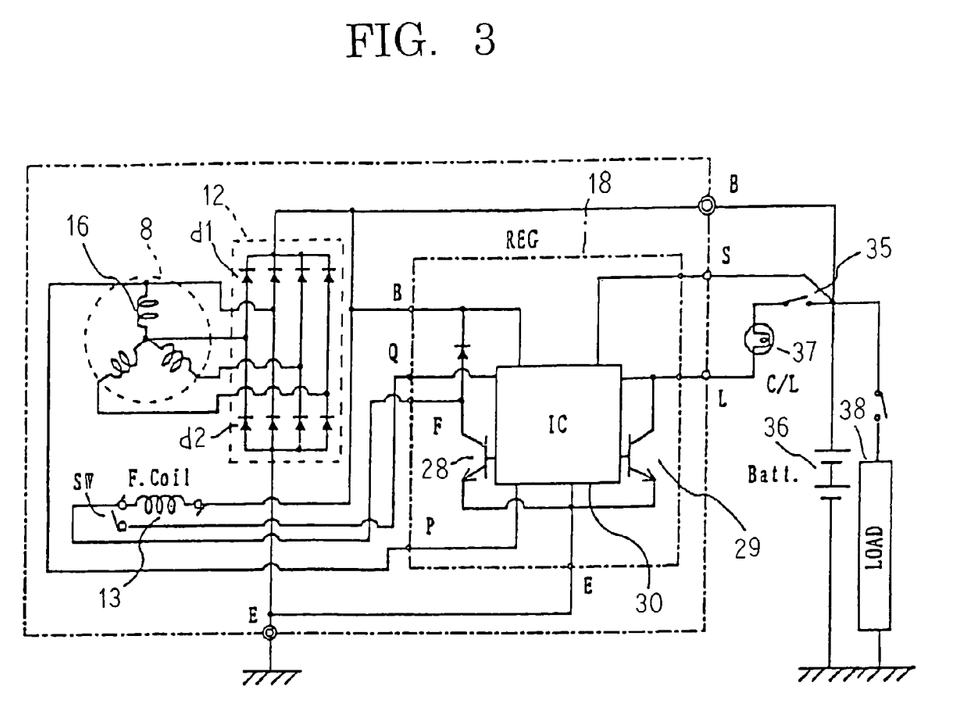
FIG. 3 is a circuit diagram explaining an electrical circuit of an automotive vehicle mounted with the automotive alternator according to the preferred embodiment of the present invention.
Figure 4:
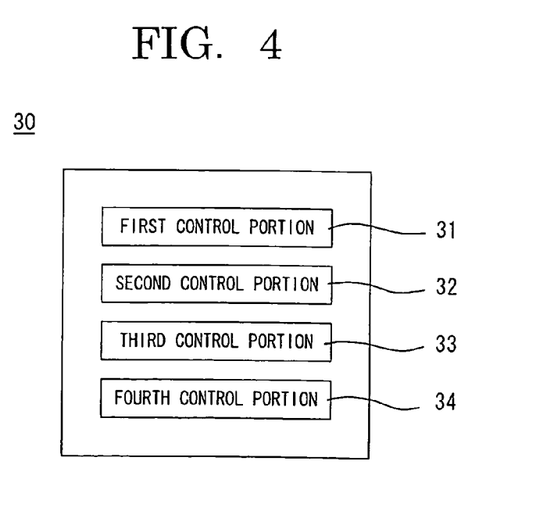
FIG. 4 is a block diagram showing control portions of a power generation control apparatus mounted to the automotive alternator according to the preferred embodiment of the present invention.
Figure 5:
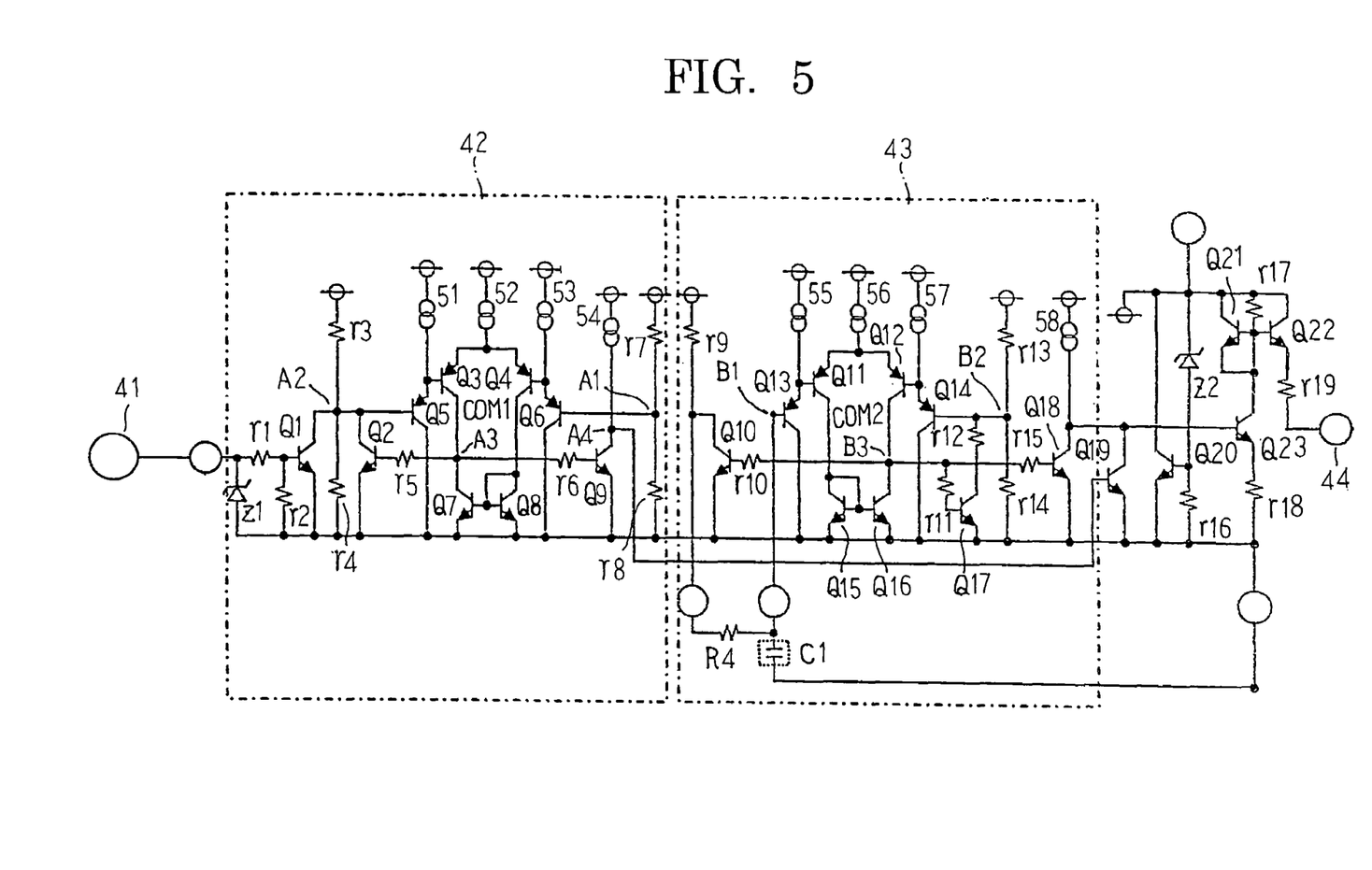
FIG. 5 is a circuit diagram showing a brush abrasion limit detecting circuit mounted to the automotive alternator according to the preferred embodiment of the present invention.
Figure 6:
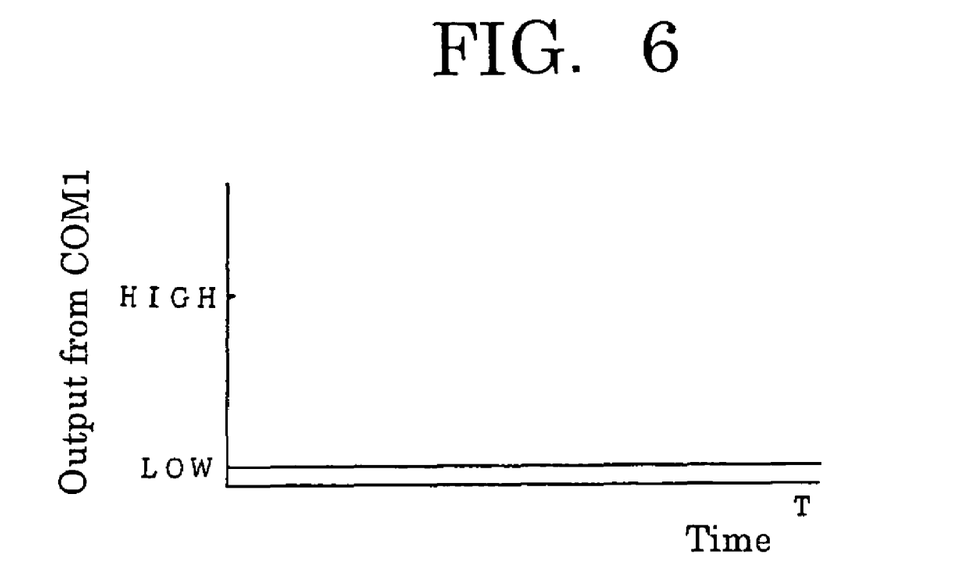
FIG. 6 is a graph showing a waveform output from a voltage comparator before a brush abrasion limit in the brush abrasion limit detecting circuit mounted to the automotive alternator according to the preferred embodiment of the present invention.
Figure 7:
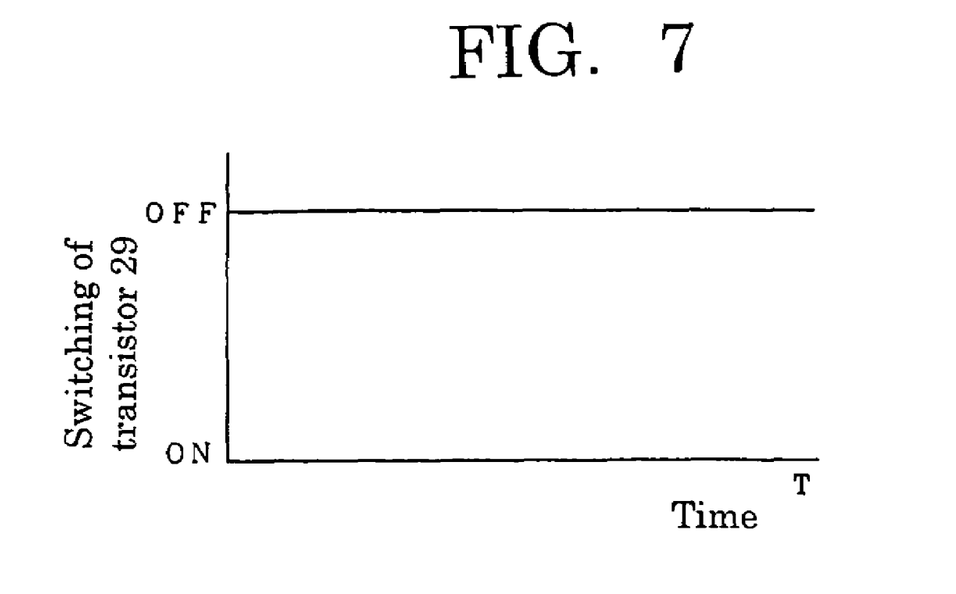
FIG. 7 is a graph showing switching characteristics before a brush abrasion limit of a transistor for lighting an indicating lamp in the automotive alternator according to the preferred embodiment of the present invention.
Figure 8:
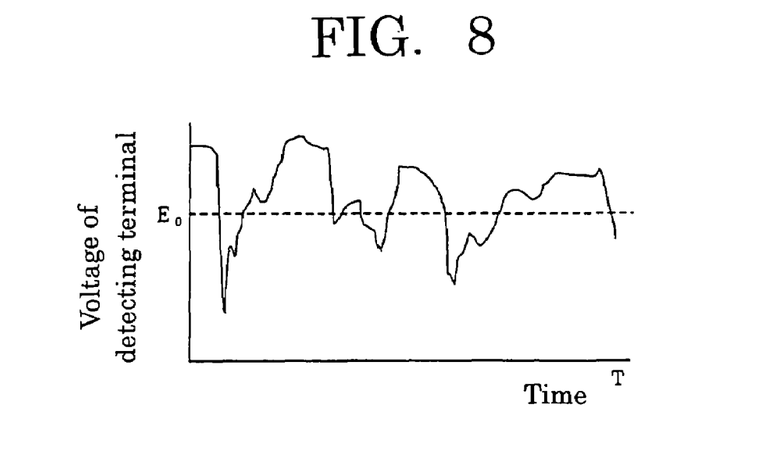
FIG. 8 is a graph showing a waveform input at the brush abrasion limit in the brush abrasion limit detecting circuit mounted to the automotive alternator according to the preferred embodiment of the present invention.
Figure 9:
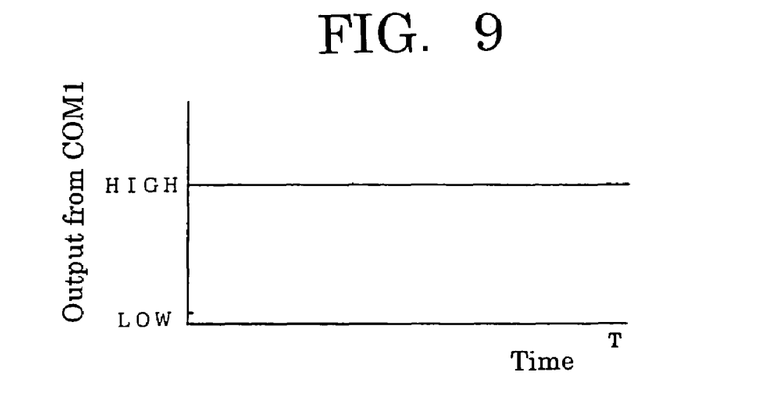
FIG. 9 is a graph showing a waveform output from the voltage comparator at the brush abrasion limit in the brush abrasion limit detecting circuit mounted to the automotive alternator according to the preferred embodiment of the present invention.
Figure 10:
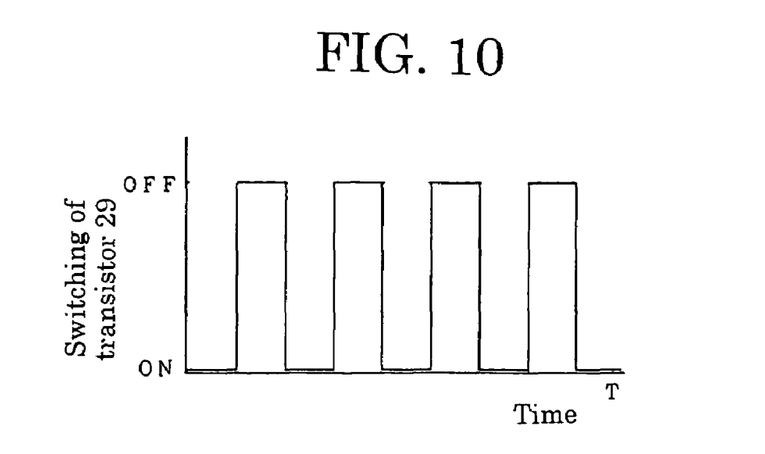
FIG. 10 is a graph showing switching characteristics at the brush abrasion limit of the transistor for lighting the indicating lamp in the automotive alternator according to the preferred embodiment of the present invention.

FIG. 1 is a longitudinal section showing an automotive alternator according to a preferred embodiment of the present invention, FIG. 2 is a perspective showing a vicinity of brushes in the automotive alternator according to the preferred embodiment of the present invention, FIG. 3 is a circuit diagram explaining an electrical circuit of an automotive vehicle mounted with the automotive alternator according to the preferred embodiment of the present invention, FIG. 4 is a block diagram showing control portions of a power generation control apparatus mounted to the automotive alternator according to the preferred embodiment of the present invention, FIG. 5 is a circuit diagram showing a brush abrasion limit detecting circuit mounted to the automotive alternator according to the preferred embodiment of the present invention, FIG. 6 is a graph showing a waveform output from a voltage comparator before a brush abrasion limit in the brush abrasion limit detecting circuit mounted to the automotive alternator according to the preferred embodiment of the present invention, FIG. 7 is a graph showing switching characteristics before a brush abrasion limit of a transistor for lighting an indicating lamp in the automotive alternator according to the preferred embodiment of the present invention, FIG. 8 is a graph showing a waveform input at the brush abrasion limit in the brush abrasion limit detecting circuit mounted to the automotive alternator according to the preferred embodiment of the present invention, FIG. 9 is a graph showing a waveform output from the voltage comparator at the brush abrasion limit in the brush abrasion limit detecting circuit mounted to the automotive alternator according to the preferred embodiment of the present invention, and FIG. 10 is a graph showing switching characteristics at the brush abrasion limit of the transistor for lighting the indicating lamp in the automotive alternator according to the preferred embodiment of the present invention.

An automotive alternator, as shown in FIG. 1, is constructed by rotatably mounting a Lundell-type rotor 7 by means of a shaft 6 inside a case 3 constituted by a front bracket 1 and a rear bracket 2 made of aluminum and fixing a stator 8 to an inner wall surface of the case 3 so as to cover an outer circumferential side of the rotor 7.

The shaft 6 is rotatably supported in the front bracket 1 and the rear bracket 2. A pulley 4 is fixed to one end of this shaft 6, enabling rotational torque from an engine to be transmitted to the shaft 6 by means of a belt (not shown).

A pair of slip rings 9 functioning as electric current receiving portions for supplying an electric current to the rotor 7 are disposed on another end portion of the shaft 6 so as to be separated in an axial direction and be able to rotate together with the shaft 6.

The rotor 7 is constituted by: a field winding 13 for generating a magnetic flux on passage of an electric current; and first and second pole cores 20 and 21 disposed so as to cover the field winding 13, magnetic poles being formed in the first and second pole cores 20 and 21 by the magnetic flux generated by the field winding 13. The first pole core 20 is made of iron, first claw-shaped magnetic poles 22 having a tapered shape being formed at a uniform angular pitch in a circumferential direction on an outer circumferential edge portion of the first pole core 20 such that a direction of taper of each of the first claw-shaped magnetic poles 22 is aligned in an axial direction. The second pole core 21 is made of iron, second claw-shaped magnetic poles 23 having a tapered shape being formed at a uniform angular pitch in a circumferential direction on an outer circumferential edge portion of the second pole core 21 such that a direction of taper of each of the second claw-shaped magnetic poles 23 is aligned in an axial direction. The first and second pole cores 20 and 21 are fixed to the shaft 6 facing each other such that the first and second claw-shaped magnetic poles 22 and 23 intermesh with each other. In addition, fans 5 are fixed to end surfaces of the first and second pole cores 20 and 21, respectively. The pair of slip rings 9 are electrically connected in series through the field winding 13.

The stator 8 is provided with: a cylindrical stator core 15; and a three-phase stator winding 16 installed in the stator core 15.

A rectifier 12 for converting alternating current generated in the stator 8 into a direct current is mounted inside the case 3, the rectifier 12 being constructed by connecting four diode pairs in parallel, each diode pair being composed of a positive-side diode $d_1$ and a negative-side diode $d_2$ connected in series, as shown in FIG. 3.

A power generation control apparatus 18 for adjusting a magnitude of an alternating voltage generated in the stator 8 is fixed to a heat sink 17.

A power supply mechanism portion 19 is constructed by housing a pair of brushes 10 in a brush holder 24 so as to be forced toward the slip rings 9 by coil springs 11, and connecting a lead wire 14 to a head portion of each of the brushes 10. A detecting terminal 25 functioning as a brush abrasion limit sensing portion, as shown in FIG. 2, is mounted to the brush holder 24 so as to electrically contact a coil spring 11 when a brush 10 is abraded to the abrasion limit. Moreover, in FIG. 2, brushes 10 having different lengths that is, a brush 10 in an initial state and a brush 10 at the abrasion limit are shown to facilitate explanation, but in normal service conditions, the pair of brushes 10 are abraded equally.

Next, operation of this automotive alternator will be explained based on FIG. 3.

First, a starter (not shown) is activated by inserting a key into a key switch 35 and turning the key switch 35, driving an engine.

An electric current is supplied to the field winding 13 from a battery 36 through the brushes 10 and the slip rings 9, generating a magnetic flux. The first claw-shaped magnetic poles 22 of the first pole core 20 are magnetized into North-seeking (N) poles by this magnetic flux, and the second claw-shaped magnetic poles 23 of the second pole core 21 are magnetized into South-seeking (S) poles. At the same time, rotational torque from the engine is transmitted to the shaft 6 by means of the belt (not shown) and the pulley 4, rotating the field rotor 7. Thus, a rotating magnetic field is imparted to the stator winding 16, generating an electromotive force in the stator winding 16. This alternating-current electromotive force passes through the rectifier 12 and is converted into a direct current, the battery 36 is charged, and the current is supplied to an electrical load 38.

Here, the power generation control apparatus 18, as shown in FIG. 4, is provided with an integrated circuit 30 including first to fourth control portions 31 to 34.

The first control portion 31 is a means for sensing a state of no power generation, monitoring a phase voltage of the stator winding 16 through a P terminal, and lighting an indicating lamp 37 by switching a transistor 29 ON when the phase voltage is 0 V. Thus, a vehicle occupant can confirm that the alternator is not generating power, that is, that the engine has stopped.

The second control portion 32 is a means for sensing a state of overvoltage, monitoring an output voltage from the rectifier 12 through a B terminal, deciding whether or not that output voltage exceeds a second set voltage, and lighting the indicating lamp 37 by switching the transistor 29 ON when the output voltage exceeds the second set voltage. Thus, the vehicle occupant can check for abnormalities (overvoltages) in the automotive vehicle being operated.

The third control portion 33 is a brush abrasion limit detecting means, monitoring a voltage of the detecting terminal 25 through a Q terminal, deciding whether or not that voltage exceeds a threshold value, and flashing the indicating lamp 37 by switching the transistor 29 ON and OFF when that voltage exceeds the threshold value. Thus, the vehicle occupant can check for the abrasion limit of the brushes 10.

The fourth control portion 34 is a controlling means for controlling an output voltage from the stator 8 so as to be constant, monitoring the output voltage from the rectifier 12 through the B terminal, and controlling the passage of electric current to the field winding 13 by switching a transistor 28 ON when that output voltage is less than a first set voltage, and by switching the transistor 28 OFF when the output voltage is equal to or greater than the first set voltage. Thus, the output voltage from the rectifier 12 is controlled so as to remain constant.

Next, a brush abrasion limit detecting operation by the third control portion 33 will be explained with reference to FIGS. 5 to 11.

The third control portion 33, as shown in FIG. 5, is provided with: a determining circuit 42 for determining the brush abrasion limit based on a voltage from a sensing portion 41; and an oscillating circuit 43 for making the indicating lamp 37 display so as to flash on and off when the determining circuit 42 determines the brush abrasion limit. A voltage comparator COM1 having a single power source is used for this determining circuit 42. The sensing portion 41 is connected to the detecting terminal 25 through the Q terminal, and an output portion 44 is connected to a base of the transistor 29. Moreover, in FIG. 5, Q1 to Q23 are transistors, r1 to r19, and R4 are resistors, C1 is a capacitor, 51 to 58 are constant current sources, and COM1 and COM2 are voltage comparators.

Before the abrasion limit of the brushes 10, the detecting terminal 25 is in a state of non-contact with the coil springs 11. At the abrasion limit of the brushes 10, the detecting terminal 25 is in a state of contact with a coil spring 11. At this time, the voltage of the detecting terminal 25 as shown in FIG. 8, fluctuates due to effects such as vibration of the vehicle, deterioration in the roundness of the slip rings 9, etc.

This voltage of the detecting terminal 25 is input into the sensing portion 41 through the Q terminal. When the voltage input into the sensing portion 41 is less than a predetermined voltage value (the threshold value $E_0$), a transistor Q1 is switched OFF. Thus, a positive-side input of COM1 (an electric potential at A1) is less than a negative-side input (an electric potential at A2), and COM1 is in an OFF state. In other words, transistors Q3 and Q5 are switched OFF, and transistors Q4 and Q6 are switched ON. Then, transistors Q8 and Q7 switch ON, and output from COM1 (an electric potential at A3) is LOW, as shown in FIG. 6. Thus, a transistor Q9 is switched OFF, and output from the determining circuit 42 (an electric potential at A4) is HIGH. As a result, a transistor Q19 is switched ON.

When the voltage input into the sensing portion 41 is less than the predetermined voltage value (the threshold value $E_0$), the transistor Q1 switches ON. Thus, the positive-side input of COM1 (the electric potential at A1) becomes greater than the negative-side input (the electric potential at A2), and COM1 switches ON. In other words, the transistors Q3 and Q5 switch ON, and the transistors Q4 and Q6 are switched OFF. Then, the transistors Q8 and Q7 are switched OFF, and the output from COM1 (the electric potential at A3) is HIGH, as shown in FIG. 9. Thus, the transistor Q9 is switched ON, and the output from the determining circuit 42 (the electric potential at A4) is LOW. As a result, the transistor Q19 is switched OFF. At this time, a transistor Q2 switches on, and the transistors Q3 and Q5 switch ON to maintain the ON state of COM1, regardless of whether the transistor Q1 is ON or OFF, that is, regardless of the magnitude of the voltage input into the sensing portion 41. In other words, the brush abrasion limit detection state is maintained.

At the same time, in the oscillating circuit 43, when a positive-side input of COM2 (an electric potential at B1) is greater than a negative-side input (an electric potential at B2), COM2 switches ON. In other words, transistors Q11 and Q13 switch OFF, transistors Q12 and Q14 switch ON, and output from COM2 (an electric potential at B3) is HIGH. Thus, a transistor Q18 is switched ON. At this time, a transistor Q10 is also switched ON, and the capacitor C1 is discharged through a resistor R4. The electric potential of the capacitor C1 gradually falls, reducing the positive-side input of COM2 (the electric potential at B1). Then, when the positive-side input of COM2 (the electric potential at B1) becomes less than the negative-side input (the electric potential at B2), COM2 switches OFF. In other words, the transistors Q11 and Q13 switch ON, and the transistors Q12 and Q14 are switched OFF. Then, the transistors Q15 and Q16 switch ON, and the output from COM2 (the electric potential at B3) is LOW. At this time, the transistor Q18 is switched OFF. At the same time, the transistor Q10 is switched OFF, and charging of the capacitor C1 is started. Then, the electric potential of the capacitor C1 rises, and when the positive-side input of COM2 (the electric potential at B1) becomes greater than the negative-side input (the electric potential at B2), COM2 switches ON.

In this manner, the transistor Q18 switches ON and OFF with a period set by a time constant of the resistor R4 and the capacitor C1.

Thus, when the transistor Q19 is in an OFF state, the transistor Q23 is switched ON and OFF by the transistor Q18 switching ON and OFF. Thus, ON and OFF signals are output from the output portion 44, the transistor 29 switches ON and OFF as shown in FIG. 10, and the indicating lamp 37 is displayed so as to flash on and off.

On the other hand, when the transistor Q19 is in an ON state, the OFF state of the transistor Q23 is maintained even if the transistor Q18 switches ON and OFF. Thus, an OFF signal is output from the output portion 44, the transistor 29 is switched OFF as shown in FIG. 7, and the indicating lamp 37 is switched off.

The flashing display of this indicating lamp 37 is continued until the power supply inside the circuit switches OFF, that is, until the key switch 35 is switched OFF. For that reason, the flashing display of the indicating lamp 37 is not performed when the key switch 35 is OFF, and the flashing display of the indicating lamp 37 is resumed if the key switch 35 is switched ON again. The vehicle occupant is made aware of the abrasion limit of the brushes 10 by visually checking for the flashing display of the indicating lamp 37. Then, the rotation of the engine is stopped by switching the key switch 35 OFF, wiring on the negative side of the battery 36 is disconnected, and replacement of the brushes 10 is performed. When the key switch 35 is switched ON after replacement of the brushes 10, since the coil springs 11 and the detecting terminal 25 are in a state of non-contact, the flashing display of the indicating lamp 37 is cancelled.

Thus, in the present invention, a determining circuit 42 is constructed such that a voltage comparator COM1 is placed in an ON state when an input voltage of a sensing portion 41 exceeds a threshold value ($E_0$), and the ON state of the voltage comparator COM1 is simultaneously maintained. In other words, the determining circuit 42 is constructed such that once it is determined that the brushes 10 have reached the abrasion limit, the result of that determination is maintained. Thus, at the abrasion limit of the brushes 10, that is, when the detecting terminal 25 has come into contact with a coil spring 11, even if the electric potential of the detecting terminal 25 fluctuates due to effects such as vibration of the vehicle, deterioration of roundness of the slip rings 9, etc., there will be no change in the determination of brush abrasion limit sensing, improving the reliability of detection. Similarly, resistance to external noise increases, improving the reliability of detection.

In the determining circuit 42, because a voltage comparator COM1 used switches ON based on a magnitude relationship between positive-side input and negative-side input, resistance to external noise increases, improving the reliability of detection.

Because the transistor 29 for lighting or flashing the indicating lamp 37 is operated directly by output from the power generation control apparatus 18, the circuit for operating the transistor 29 is constructed inside an integrated circuit, enabling a reduction in the number of parts, thereby providing a cost reduction effect. In addition, because the integrated circuit 30 has a flashing mechanism for the indicating lamp 37, a reduction in the number of parts is similarly enabled, thereby providing a cost reduction effect.

In conventional devices, because input from a brush abrasion limit sensing portion (the light-receiving portion 114) is used as the power supply voltage for the display circuit (the astable multivibrator 112) for the indicating lamp 106, problems arose, such as the input from the sensing portion fluctuating due to effects such as vibration, etc., electric power for activating the indicating lamp 106 being insufficient, etc., making it difficult to confirm the periodic flashing of the indicating lamp 106. However, in the present invention, because the power supply voltage of the signal generating circuit 43 for flashing the indicating lamp 37 is supplied from the battery 36 through a constant voltage circuit, the oscillating operation thereof does not depend on the input from the brush abrasion limit sensing portion, making it stable, and the above problems do not arise.

Because the third control portion 33 for sensing the brush abrasion limit is constructed on a single integrated circuit 30 together with the first control portion 31 for sensing a state of no power generation in the alternator, the second control portion 32 for sensing a state of overvoltage of the alternator, and the fourth control portion 34 for controlling the output voltage of the alternator so as to be constant, the number of parts is reduced, enabling costs to be reduced.

Because the construction is such that the brush abrasion limit is announced by the flashing display of the indicating lamp 37, and the states of no power generation and overvoltage are announced by a lit display of the indicating lamp 37, the vehicle occupant can easily differentiate between the brush abrasion limit from the states of no power generation and overvoltage.

Moreover, in the above embodiment, the determining circuit 42 and the oscillating circuit 43 are constructed so as to operate independently, but similar effects can also be achieved by connecting output from COM1 of the determining circuit 42 in series with the oscillating circuit 43.

In the above embodiment, resistance to noise can be increased if a capacitor is inserted between the sensing portion 41 and the base of the transistor Q1.

In the above embodiment, a function for warning of a brush abrasion limit (the third control portion 33) is explained as being added to a power generation control apparatus 18 having a power generation control function (the fourth control portion 34) and diagnostic functions (the first and second control portions 31 and 32), but it goes without saying that a function for warning of a brush abrasion limit may also be added to a power generation control apparatus having only a power generation control function.

Although not mentioned in the above embodiment, it is desirable for the abrasion limit of the brushes 10 to be announced such that a predetermined remainder remains relative to the abrasion limit. In this manner, normal operation for a predetermined distance becomes possible after the flashing display of the indicating lamp 37 is started, preventing the alternator from entering a state of no power generation before replacement of the brushes, etc.

In the above embodiment, the determining circuit 42 determines the brush abrasion limit based on the voltage of the detecting terminal 25, but the determining circuit 42 may also determine the brush abrasion limit based on an electric current flowing through the detecting terminal 25.

In the above embodiment, the brush abrasion limit sensing portion is explained as being constructed so as to sense the abrasion limit of the brushes 10 by contact between a detecting terminal 25 and a coil spring 11, but the brush abrasion limit sensing portion is not limited to this construction and, for example, a construction in which a light source and a photodetector are used and the abrasion limit of the brushes 10 is sensed by the photodetector receiving light from the light source is also acceptable.

The above embodiment is explained as it applies to an automotive alternator, but it goes without saying that the present invention is not limited to alternators, and can be applied to any rotary electric machine such as an alternating-current motor, an alternating-current generator-motor, etc.

INDUSTRIAL APPLICABILITY

As explained above, because a rotary electric machine according to the present invention can achieve sensing of a brush abrasion limit highly reliably and inexpensively, it is useful as a rotary electric machine for mounting to an automotive vehicle such as automobile, etc.

The invention claimed is:

1. An automotive rotary electric machine comprising:
a rotor having:
 a field winding for generating a magnetic flux on application of an excitation current;
 a plurality of magnetic poles magnetized by said magnetic flux; and
 a current receiving portion electrically connected to said field winding;
a power supply mechanism portion having:
 a brush in contact with said current receiving portion;
a brush abrasion limit sensing portion for sensing that said brush has abraded to a predetermined length;
a brush abrasion limit detecting means constructed so as to monitor an output from said brush abrasion limit sensing portion, to enter a brush abrasion limit detection state at a point in time when said output exceeds a set value, and including switching means for thereafter maintaining said brush abrasion limit detection state regardless of whether said output exceeds said set value;
a stator having a stator winding in which an electromotive force is generated on application of a rotating magnetic field accompanying rotation of said rotor; and
a controlling means for controlling an output voltage from said stator so as to be constant,
wherein said brush abrasion limit detecting means and said controlling means are constructed in a single integrated circuit.

2. An automotive rotary electric machine comprising:
a stator having a stator winding;
a rotor having:
 a field winding for generating a magnetic flux on application of an excitation current;
 a plurality of magnetic poles magnetized by said magnetic flux; and
 a current receiving portion electrically connected to said field winding;
a power supply mechanism portion having:
a brush in contact with said current receiving portion;
a brush abrasion limit sensing portion for sensing that said brush has abraded to a predetermined length;
a brush abrasion limit detecting means constructed so as to monitor an output from said brush abrasion limit sensing portion, to enter a brush abrasion limit detection state at a point in time when said output exceeds a set value, and including switching means for thereafter maintaining said brush abrasion limit detection state regardless of whether said output exceeds said set value;
means for sensing at least one of a state of no power generation and a state of overvoltage by monitoring an output voltage of said stator, and
a controlling means for controlling an output voltage from said stator so as to be constant;

wherein said means for sensing at least one of a state of no power generation and a state of overvoltage is constructed in a single integrated circuit; and wherein said brush abrasion limit detecting means and said controlling means are constructed in a single integrated circuit.

3. An automotive rotary electric machine comprising:

a rotor having:
- a field winding for generating a magnetic flux on application of an excitation current;
- a plurality of magnetic poles magnetized by said magnetic flux; and
- a current receiving portion electrically connected to said field winding;

a power supply mechanism portion having:
- a brush in contact with said current receiving portion;

a brush abrasion limit sensing portion for sensing that said brush has abraded to a predetermined length;

a brush abrasion limit detecting means constructed so as to monitor an output from said brush abrasion limit sensing portion, to enter a brush abrasion limit detection state at a point in time when said output exceeds a set value, and including switching means for thereafter maintaining said brush abrasion limit detection state regardless of whether said output exceeds said set value;

means for sensing at least one of a state of no power generation and a state of overvoltage;

an indicating lamp;

wherein said indicating lamp is constructed so as to flash on and off when said brush abrasion limit detecting means detects a brush abrasion limit, and so as to be continuously lit when said means for sensing at least one of a state of no power generation and a state of overvoltage senses at least one of a state of no power generation and a state of overvoltage.

* * * * *